US012188176B2

(12) United States Patent
Beauduin et al.

(10) Patent No.: US 12,188,176 B2
(45) Date of Patent: Jan. 7, 2025

(54) YARN DYEING DEVICE

(71) Applicant: Superba S.A.S., Mulhouse (FR)

(72) Inventors: Charles Beauduin, Halle (BE); Philippe Massotte, Gueberschwihr (FR)

(73) Assignee: Superba S.A.S., Mulhouse (FR)

( * ) Notice: Subject to any disclaimer, the term of this patent is extended or adjusted under 35 U.S.C. 154(b) by 1054 days.

(21) Appl. No.: 16/919,587

(22) Filed: Jul. 2, 2020

(65) Prior Publication Data

US 2021/0002822 A1 Jan. 7, 2021

(30) Foreign Application Priority Data

Jul. 4, 2019 (EP) .................................... 19315057

(51) Int. Cl.

| | |
|---|---|
| ***D06P 7/00*** | (2006.01) |
| ***B05B 7/00*** | (2006.01) |
| ***B05B 12/02*** | (2006.01) |
| ***B05B 12/04*** | (2006.01) |
| ***B05B 12/16*** | (2018.01) |
| ***D06B 1/02*** | (2006.01) |
| ***D06B 11/00*** | (2006.01) |

(52) U.S. Cl.

CPC .................. *D06P 7/00* (2013.01); *B05B 7/00* (2013.01); *B05B 12/02* (2013.01); *B05B 12/04* (2013.01); *B05B 12/16* (2018.02); *D06B 1/02* (2013.01); *D06B 11/0036* (2013.01)

(58) Field of Classification Search

None

See application file for complete search history.

(56) References Cited

U.S. PATENT DOCUMENTS 4,100,724 A * 7/1978 Bous .................. D06B 11/0023 57/295

FOREIGN PATENT DOCUMENTS

| | | |
|---|---|---|
| JP | 2003342867 A | 12/2003 |
| WO | 2017200473 A1 | 11/2017 |

OTHER PUBLICATIONS

Europe Patent Application No. 19315057.0, Search Report and Written Opinion, dated Jan. 7, 2020.

* cited by examiner

*Primary Examiner* — Rita P Adhlakha

(74) *Attorney, Agent, or Firm* — Kilpatrick Townsend & Stockton LLP

(57) ABSTRACT

The present invention relates to a device for dyeing a moving yarn that comprises a liquid dye supply line, a first nozzle positioned above the yarn and configured to deposit dye on a first surface of the yarn, a second nozzle positioned above the yarn and configured to deposit dye on a second surface of the yarn corresponding to a surface opposite the first surface relative to the axis of the yarn, a synchronization mechanism for actuating the nozzles as a function of the movement of the yarn such that, between the first and the second nozzle, the yarn is able to pivot axially under the effect of the gravity of the dye deposited by the first nozzle.

10 Claims, 3 Drawing Sheets

[Fig. 1]
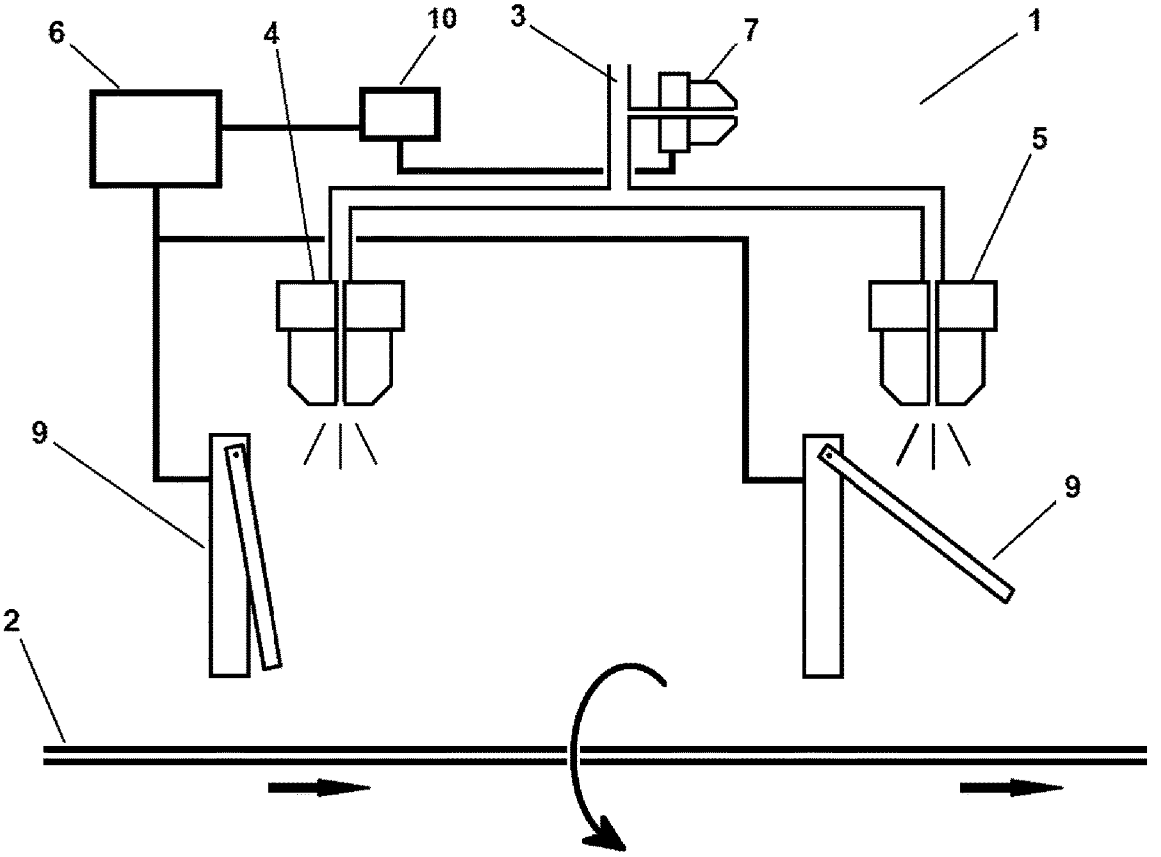
[Fig. 2]
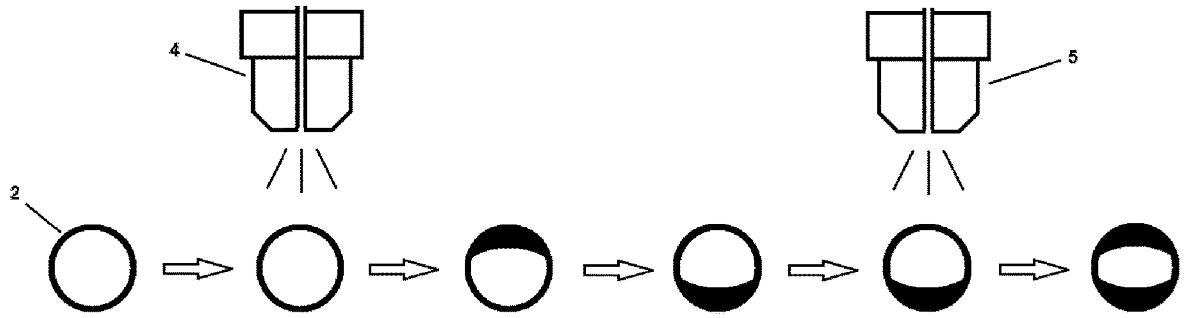

[Fig. 3]
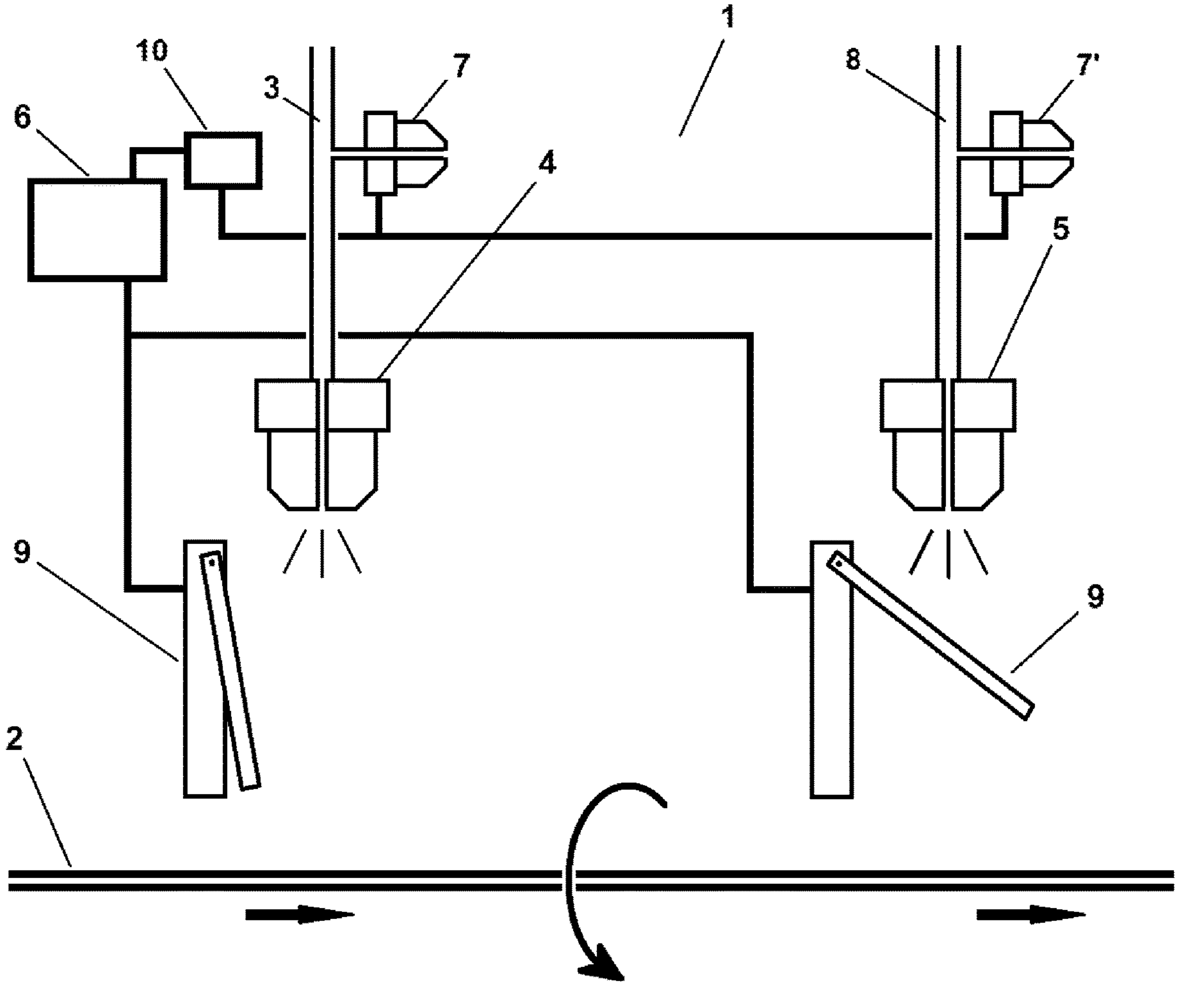

[Fig. 4]
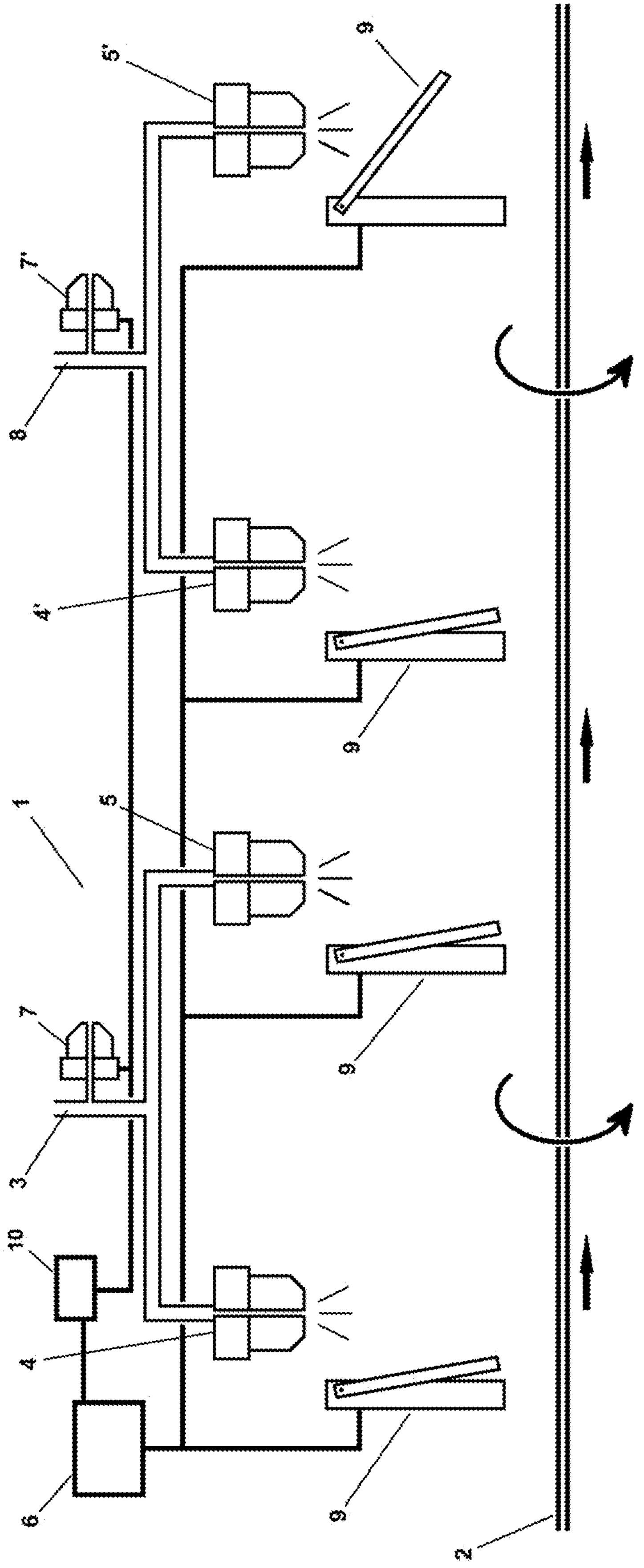

YARN DYEING DEVICE

CROSS REFERENCE TO RELATED APPLICATIONS

This application is related to and claims priority benefits from Europe Patent Application No. 19315057.0 ("the '570 application"), filed on Jul. 4, 2019. The '570 application is hereby incorporated in its entirety by this reference.

FIELD OF THE INVENTION

The present invention relates to the field of the textile industry, and more particularly to the field of treating yarns by dyeing.

BACKGROUND

In the context of an industrial production of yarns for textile use, one essential operation that partly conditions its marketing relates to the step of coloring the yarn by dyeing it. The yarn is configured to be moved axially between two bearings such that the movement axis of the yarn crosses an ink jet intended to color it in a controlled manner. Currently, the deposition of the ink is carried out in the form of a continuous ink jet sprayed by a nozzle. The moving textile yarn passes through the ink jet. According to one exemplary embodiment, controlling the deposit of ink on the yarn involves a mechanism of periodic deflection of the ink jet with respect to the moving yarn when certain segments of the yarn are not intended to be dyed. The ink deflected so as not to dye the yarn is then recovered.

Although such a mechanism makes it possible to perform a controlled deposition of dye on the yarn with a movement speed of the yarn on the order of 600 meters per minute, it has the drawback of requiring that a large volume of dye be sprayed so that the yarn is colored over its entire section.

SUMMARY

The present invention aims to address these drawbacks by proposing a dyeing mechanism for a textile yarn that makes it possible to reduce the consumption of dye necessary for dyeing a yarn while allowing movement of the yarn at speeds of more than 500 meters per minute.

The invention therefore relates to a device for dyeing a yarn driven in movement, characterized in that the device comprises:

- at least one supply line for liquid dye,
- at least a first deposition nozzle positioned above the moving yarn and configured to deposit a liquid dye on a first surface of a portion of the length of the yarn,
- at least a second deposition nozzle positioned above the moving yarn and configured to deposit a liquid dye on a second surface of the same portion of the length of the yarn, the second surface corresponding to a surface arranged at the face opposite the first surface relative to the axis of the yarn,
- a mechanism for synchronizing the successive actuation of each of the deposition nozzles as a function of the movement of the yarn so that, between the first nozzle and the second nozzle, the portion of the length of the yarn is able to pivot axially under the effect of the gravity of the liquid dye deposited by the first nozzle.

The invention also relates to a method for dyeing a yarn using a device according to the invention, characterized in that the method comprises:

- a step for depositing a dye on a first surface of a portion of the length of the yarn by a first deposition nozzle,
- a step for axial movement of the colored portion of the length of yarn together with an axial pivoting of the colored portion of the length of yarn under the effect of the gravity of the deposited liquid dye,
- a step for depositing the same dye on a second surface of the same portion of the length of the yarn by the second deposition nozzle.

BRIEF DESCRIPTION OF THE DRAWINGS

The invention will be better understood from the following description, which relates to preferred embodiments, given by way of nonlimiting examples, and explained with reference to the appended schematic drawings, in which:

FIG. 1 is a schematic illustration of an example of a dyeing device according to the invention.

FIG. 2 shows an example of schematic kinematics of an embodiment of a dyeing device according to the invention in which the yarn is illustrated in section.

FIG. 3 shows a schematic illustration of a specific example of a dyeing device according to the invention.

FIG. 4 shows a schematic illustration of another specific example of a dyeing device according to the invention.

DETAILED DESCRIPTION

The invention relates to a device 1 for dyeing a yarn 2 driven in movement, characterized in that the device 1 comprises:

- at least one supply line 3 for liquid dye,
- at least a first deposition nozzle 4 positioned above the moving yarn 2 and configured to deposit a liquid dye on a first surface of a portion of the length of the yarn 2,
- at least a second deposition nozzle 5 positioned above the moving yarn 2 and configured to deposit a liquid dye on a second surface of the same portion of the length of the yarn 2, the second surface corresponding to a surface arranged at the face opposite the first surface relative to the axis of the yarn 2,
- a mechanism 6 for synchronizing the successive actuation of each of the deposition nozzles 4, 5 as a function of the movement of the yarn 2 so that, between the first nozzle 4 and the second nozzle 5, the portion of the length of the yarn 2 is able to pivot axially under the effect of the gravity of the liquid dye deposited by the first nozzle 4.

The expression "surface of a yarn portion" should be understood as referring to a part of the peripheral surface corresponding to a length of an arc on the order of 180° centered on the axis of the yarn 2 and along a length of the yarn 2 along the axis of the yarn 2. Thus, during a movement along a substantially horizontal axis or along an axis forming an incline relative to the vertical, the yarn 2 comprises a yarn portion surface that is greater, that is to say oriented substantially upward, at which a deposition nozzle 4, 5 is capable of depositing an amount of liquid dye.

The dyeing device according to the invention is thus configured to perform two successive dye deposits on each of the opposite faces of a same length portion of the yarn 2 by causing an axial pivoting of the yarn 2. The successive positioning of a different face of the yarn 2 in front of a respective deposition nozzle 4, 5 makes it possible to deposit dye on different surfaces of the same length portion of the yarn 2. The inventive device is configured to allow the axial pivoting of the yarn 2 moving between the two deposition nozzles 4, 5. According to one preferred implementation of the inventive device, only a limited amount of dye is deposited by the first nozzle 4 on the first surface of the yarn 2, so that the thickness of the yarn 2 is not impregnated with the dye and that, by gravity and under the imbalanced weight of the dye deposited on the first upper surface of the yarn 2, the yarn 2 pivots axially by placing the first colored surface, initially upper, in the lower position and simultaneously pivots the second blank surface, initially lower, in the upper position.

According to a particular construction example of the device, the coloring of a length portion of the yarn 2 only requires depositing dye volumes strictly suited to the surfaces to be dyed. Indeed, while in the devices of the prior art, the coloring of a yarn length portion involves depositing dye at a first surface so that the dye passes through the thickness of the yarn to also color the surface of the yarn opposite the second surface, the inventive device allows the dye to be deposited at each opposite face of a length portion of the yarn 2 without requiring the presence of dye in the thickness of the yarn 2. Also, in the context of a device 1 according to the invention, the volume of dye necessary to dye a length portion of the yarn 2 is less than that used in the context of a device of the prior art. This difference in required volume makes it possible to save dye by avoiding unnecessary coloring of the internal thickness of the yarn 2.

According to another particular construction example, complementary to the previous particular example, the first nozzle 4 and the second nozzle 5 are supplied with liquid dye by a common supply line 3. This arrangement makes it possible to deposit, by each of the nozzles 4, 5, the same color on each of the opposite faces of the thickness of the yarn 2. Furthermore, this arrangement also makes it possible to obtain a uniform pressure at the liquid dye moving in the supply line 3, so that the jet of dye obtained at each of the nozzles 4, 5 is substantially identical.

According to another particular construction example, complementary to the various previous specific examples, the device 1 comprises a mechanism for managing the pressure of the liquid dye near at least one deposition nozzle 4, 5. This mechanism for managing the pressure of the liquid dye positioned on a part of the dye supply line 3 in particular allows a reduction in the pressure at the deposition nozzle 4, 5 so that the quantity of dye sprayed by the deposition nozzle 4, 5 is reduced in proportion. The pressure management mechanism thus makes it possible to manage the quantity of dye sprayed and to obtain an adjustable deposit of dye on the surface of the yarn 2.

According to a specific feature of this other particular construction example, the pressure management mechanism comprises at least one dye ejection nozzle 7. This dye ejection nozzle 7, positioned on a part of the dye supply line 3, for example near a deposition nozzle 4, 5, is controlled to reduce the pressure at the supply line by decreasing the quantity of dye present in the supply line 3. The actuation of the opening of this ejection nozzle 7 is controlled by a control unit 10. This control unit 10 can be connected to at least one sensor for the dye pressure inside the associated supply line 3. This control unit 10 is preferably designed to manage the internal pressure of the associated line 3 automatically. According to a complementary preferred construction, the control unit 10 operates under the control of a programmed interface that predefines the quantity of dye to be deposited at least at a portion of the treated yarn 2. Since the treated yarn 2 is in continuous motion, the quantity of dye to be deposited at a defined portion is then calibrated as a function of the pressure of the dye inside the associated line 3. In fact, the higher the pressure inside the supply line 3, the greater the quantity of dye sprayed at the deposition nozzle 4, 5. The pressure exerted by the dye inside the supply line 3 is generated by the continuous operation of a supply pump positioned upstream from the supply line 3. Also, when the deposition 4, 5 or ejection 7 nozzles are closed, the pressure inside the supply line increases. According to an alternative preferred construction feature, the dye supply flow from the pump is greater than the dye outlet flow at the set of deposition nozzles 4, 5 associated with the supply line 3, so that an operation of the deposition nozzles 4, 5 with a permanent opening when no ejection nozzle 7 is open also allows an increase in the pressure inside the supply line 3. The dye supply flow by the pump is also calibrated so that the opening of an ejection nozzle 7 performs a withdrawal of dye from the supply line 3 that is sufficient to reduce the pressure and/or increase this pressure generated by the continuous operation of the supply pump. According to a preferred construction, the adjustment of the pressure inside the supply line 3 involves several ejection nozzles 7 arranged at the same supply line 3 and controlled by the control unit 10 so that, by opening/closing only one of the ejection nozzles 7 or several ejection nozzles 7 simultaneously, the internal pressure of the supply duct 3 is able to be adjusted more finely, but also more quickly. Alternatively or additionally, the adjustment of the internal pressure of the supply line 3 involves one or more variable-flow ejection nozzles 7. These variable-flow ejection nozzles 7 for example incorporate a diaphragm that adjusts the opening of the orifice of the ejection nozzles 7 as a function of the desired dye flow. Also, managing the pressure of the dye inside the associated line 3 via the control unit 10 allows an adjustment of the quantity of dye ejected at the deposition nozzle 4, 5 and intended to be deposited on the moving yarn 2. According to a specific embodiment of this feature, the control unit 10 operates in association with the synchronization mechanism 6 of the successive actuation of each of the deposition nozzles 4, 5 of the device. According to an additional specific feature, this control unit 10 is integrated into the synchronization mechanism 6 of the actuation.

According to another particular construction example, complementary to the various previous specific examples, the device 1 comprises a mechanism for axial pivoting of the yarn 2. According to an exemplary embodiment, this pivoting mechanism involves controlling the tension of the yarn moving between the two deposition nozzles 4, 5 such that the traction produced on the yarn as part of its movement does not generate too great a tension on the yarn likely to prevent its axial pivoting. According to another exemplary embodiment, this pivoting mechanism comprises an interface for unbalancing the first colored surface of the yarn 2, so that the yarn 2 pivots axially under the effect of the weight of the deposited dye. According to another exemplary embodiment, this pivoting mechanism comprises an interface for driving the axial rotation of the yarn 2 about its own axis. It should be noted that the pivoting mechanism integrated into the inventive device can be made by one or a combination of these exemplary embodiments of the pivoting mechanism.

According to another particular construction example, complementary to the various previous specific examples, the dyeing device 1 comprises:

a supply line 3, 8 for supplying liquid dye for each primary color and/or for the black color, a plurality of deposition nozzles 4, 5, 4', 5' aligned along the movement axis of the yarn 2, so that each liquid dye supply line 3, 8 supplies at least one deposition nozzle 4, 5, 4', 5'.

One specific feature of this particular construction example makes it possible to carry out a combination of deposits of differing liquid dyes at opposite surfaces of a moving yarn 2 when the device 1 comprises two deposition nozzles 4, 5 and each of these nozzles 4, 5 is supplied with a respective color. Another specific feature of this particular construction example also allows the positioning of pairs of deposition nozzles 4, 5, 4', 5' supplied with a liquid dye of a respective primary color. Also, the presence of a pair of deposition nozzles 4, 5, 4', 5' for each primary color of liquid dye makes it possible to dye the moving yarn 2 in a wide range of colors owing to the combination of liquid dye deposits of one or more different primary colors. Each of the pairs of deposition nozzles 4, 5, 4', 5' is thus supplied by a respective supply line 3, 8. Each of the nozzles 4, 5, 4', 5' of a same pair is thus configured to color a different surface of the yarn at a same length portion. Furthermore, in this particular construction example, each of the liquid dye supply lines 3, 8 is associated with a respective dye ejection nozzle 7, 7' that participates in the mechanism for managing the pressure of the device.

According to another particular construction example, which is complementary to the various previous specific examples, at least one deposition nozzle 4, 5 is associated with a mechanism 9 for interrupting the spraying of dye comprising at least one interface for deflecting the jet of dye sprayed toward a receiving tray. This mechanism 9 for interrupting the spraying of dye onto the moving yarn 2 makes it possible to maintain a constant flow of liquid dye sprayed by the deposition nozzle 4, 5 while spreading the sprayed jet of dye relative to the moving yarn 2. This mechanism 9 for interrupting the spraying by deflection of the jet thus authorizes an interruption in the deposition of liquid dye for a reduced time interval, on the order of 2 milliseconds. This mechanism thus allows precision in the deposition on the one hand, and in the absence of dye deposition on a yarn 2 moving at a speed on the order of 600 meters per minute on the other hand. Preferably, the mechanism 9 for interrupting the spraying of each of the deposition nozzles 4, 5, 4', 5' is associated with the mechanism 6 for synchronizing the actuation of the nozzles 4, 5, 4', 5'. This synchronization mechanism 6 thus plays a role, in cooperation with the different nozzles 4, 5, 4', 5' that it actuates, in distributing one or more dyes along the length of the moving yarn 2. This synchronization mechanism 6 preferably operates under the control of a programmed interface that predefines the desired coloring for at least a portion of the treated yarn 2.

According to a preferred arrangement of the device 1 according to the invention, the liquid dye sprayed outside the supply line 3 by a deposition nozzle 4, 5, 4', 5' or by a dye ejection nozzle 7, 7' and which is not deposited on a surface of the yarn 2, is recovered at a dedicated interface to be reused, or even reinjected into the supply line 3.

The invention also relates to a method for dyeing a yarn using a device 1 according to the invention, characterized in that the method comprises:

a step for depositing a dye on a first surface of a portion of the length of the yarn 2 by a first deposition nozzle 4, a step for axial movement of the colored portion of the length of yarn 2 together with an axial pivoting of the colored portion of the length of yarn 2 under the effect of the gravity of the deposited liquid dye, a step for depositing the same dye on a second surface of the same portion of the length of the yarn 2 by the second deposition nozzle 5.

According to a particular embodiment feature of the inventive method, the method comprises at least one step of depositing a dye using a deposition nozzle 4, 5 correlated with a step of opening a dye ejection nozzle 7 upstream from the deposition nozzle 4, 5 so as to control the quantity of dye sprayed by the deposition nozzle 4, 5.

Of course, the invention is not limited to the embodiments described and shown in the accompanying drawings. Modifications remain possible, in particular from the point of view of the constitution of the various elements or by substitution of technical equivalents, without departing from the scope of protection of the invention.

That which is claimed is:

1. A device for dyeing a moving yarn, wherein the device comprises:

at least one supply line for liquid dye, a first deposition nozzle positioned above a path for the moving yarn, wherein the first deposition nozzle is configured to deposit a liquid dye on a first surface of a portion of a length of the yarn, a second deposition nozzle positioned above the path for the moving yarn and downstream from the first deposition nozzle, wherein the second deposition nozzle is configured to deposit the liquid dye on a second surface of the same portion of the length of the yarn, the second surface corresponding to a surface arranged opposite the first surface relative to an axis of the yarn, a synchronizing mechanism for synchronizing the successive deposition of the liquid dye by the first deposition nozzle and the second deposition nozzle, wherein the synchronizing mechanism is configured to control an amount of the liquid dye deposited by the first deposition nozzle on the first surface based on movement of the yarn and such that a thickness of the yarn is not impregnated by the liquid dye and such that the amount of liquid dye on the yarn comprises a weight imbalanced on the first surface to generate axial pivoting of the yarn under the effect of gravity of the liquid dye deposited by the first deposition nozzle, between the first nozzle and the second nozzle and such that the second surface faces the second deposition nozzle when the portion of the yarn is at the second deposition nozzle.

2. The device for dyeing a yarn according to claim 1, characterized in that the first depositing nozzle and the second depositing nozzle are supplied with liquid dye by a common supply line.

3. The device or dyeing a yarn according to claim 1, characterized in that the device further comprises a pressure management mechanism for managing a pressure of the liquid dye near at least one deposition nozzle.

4. The device for dyeing a yarn according to claim 3, characterized in that the mechanism for managing the pressure comprises at least one dye ejection nozzle positioned on the liquid dye supply line.

5. The device for dyeing a yarn according to claim 4, characterized in that the mechanism for managing the pressure also comprises a control unit for actuating at least one dye ejection nozzle.

6. The device for dyeing a yarn according to claim 4, characterized in that at least one ejection nozzle is a variable-flow nozzle.

7. The device for dyeing a yarn according to claim 5, characterized in that the control unit is connected to the synchronization mechanism to operate in association therewith.

8. The device for dyeing a yarn according to claim 1, characterized in that the device comprises an axial pivoting mechanism for the yarn.

9. The device for dyeing a yarn according to claim 1, characterized in that the dyeing device comprises:

a liquid dye supply line for each primary color and/or for the color black, a plurality of deposition nozzles aligned along the movement axis of the yarn, so that each liquid dye supply line supplies at least one deposition nozzle.

10. The device for dyeing a yarn according to claim 1, characterized in that at least one deposition nozzle is associated with a mechanism for interrupting a spraying of dye comprising at least one interface for deflecting a jet of dye sprayed toward a receiving tray.

* * * * *